_Patented Mar. 5, 1963_

**3,080,402
7-METHYL PREGNENES AND PROCESS
THEREFOR**
Howard J. Ringold and George Rosenkranz, Mexico City,
Mexico, assignors, by mesne assignments, to Syntex
Corporation, a corporation of Panama
No Drawing. Filed Nov. 12, 1957, Ser. No. 695,493
Claims priority, application Mexico Nov. 13, 1956
13 Claims. (Cl. 260—397.45)

The present invention relates to novel cyclopentanophenanthrene derivatives and to a novel process for their production.

More particularly the present invention relates to cortical hormones i.e. $17\alpha$-21-dihydroxy-3-keto-$\Delta^4$-pregnene and $\Delta^{1,4}$-pregnadiene derivatives having a 7-methyl substituent. Specific examples of these compounds are 7-methyl-$\Delta^4$-pregnen-17$\alpha$,21-diol-3,11,20-trione (7-methyl-cortisone), 7-methyl-$\Delta^4$-pregnen-11$\beta$, 17$\alpha$,21-triol-3,20-dione (7-methyl-hydrocortisone), 7-methyl-$\Delta^{1,4}$-pregnadien-17$\alpha$-21-diol-3,11,20-trione (7-methyl-1-dehydro-cortisone), 7-methyl-$\Delta^{1,4}$-pregnadien-11$\beta$, 17$\alpha$,21-triol-3,20-dione (7-methyl-1-dehydro-hydrocortisone), as well as their esters as hereinafter set forth. All of the specific products just heretofore numerated are active cortical hormones of value for the treatment of inflammation and exhibit for example a pronounced glycogen deposition effect in the mammalian liver. Both the $7\alpha$-methyl and $7\beta$-methyl derivatives of the character just referred to and mixtures thereof are active cortical hormones.

In accordance with the present invention it has been discovered that a mixture of the $7\alpha$ and $7\beta$-methyl derivatives of cortisone, hydrocortisone, $\Delta^1$-dehydro-cortisone and $\Delta^1$-dehydro-hydrocortisone as well as their conventional type esters may be prepared from the known di-cycloethyleneketals of $\Delta^4$-pregnen-17$\alpha$,21-diol-3,20-dione having an 11$\beta$-ol or 11-one group (Bernstein, Heller, Little, and Williams, J. Org. Chem. 18, 70 (1953)). When esters of these ketals are treated with an N-bromoimide or N-bromo-amide such as N-bromotoluenesulfonamide, N-bromophthalimide, N-bromoacetamide or N-bromosuccinimide, a 7-bromo compound results and this 7-bromo compound may be thereafter substituted by a methyl group by treatment with methyl magnesium bromide. There is thus obtained the corresponding 7-methyl-diketal which upon hydrolysis in acid medium, as for example by refluxing with dilute sulfuric acid gives rise to a 7-methyl-$\Delta^4$-pregnen-17$\alpha$,21-diol-3,20-dione derivative such as 7-methyl cortisone or 7-methyl hydrocortisone. The compounds obtained by this method are a mixture of $7\alpha$-methyl and $7\beta$-methyl derivatives with the $7\alpha$-methyl predominating. These compounds further were esterified at the C-21 position by routine methods such as by reaction with acid anhydrides or chlorides in pyridine solution. The resultant esters were the conventional esters known in the steroid art and generally referred to as hydrocarbon carboxylic acid esters of from 2 to 12 carbon atoms. These last esters can then be utilized as intermediates for the production of the corresponding 1-dehydro derivatives by reacting these esters with a dehydrogenating agent as for example selenium dioxide in the presence of small amounts of acetic acid and, there is thus obtained the corresponding esters of 7-methyl-$\Delta^{1,4}$-pregnadiene-17$\alpha$,21-diol-3,20-dione having in addition either an 11-keto group or an 11$\beta$-hydroxy group. By conventional saponification there was then prepared the corresponding $\Delta^1$-cortisone or $\Delta^1$-hydrocortisone derivative with the same 7-methyl substituent as heretofore set forth. From the free compounds there could of course be prepared the corresponding 21-esters. The following formula indicates the specific compounds of the present invention as hereinbefore enumerated.

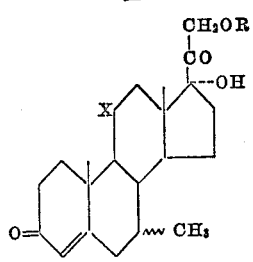

and

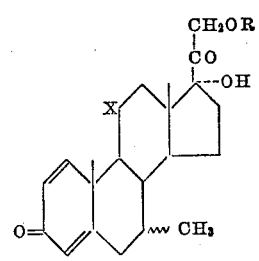

In the above formulas X represents =O and

and R represents hydrogen or a hydrocarbon carboxylic acylate of 2 to 12 carbon atoms such as acetate, propionate, butyrate, hemisuccinate, caproate, benzoate, trimethylacetate, phenoxyacetate, cyclopentylpropionate and $\beta$-chloropropionate.

The novel process of the present invention may be illustrated by the following equation:

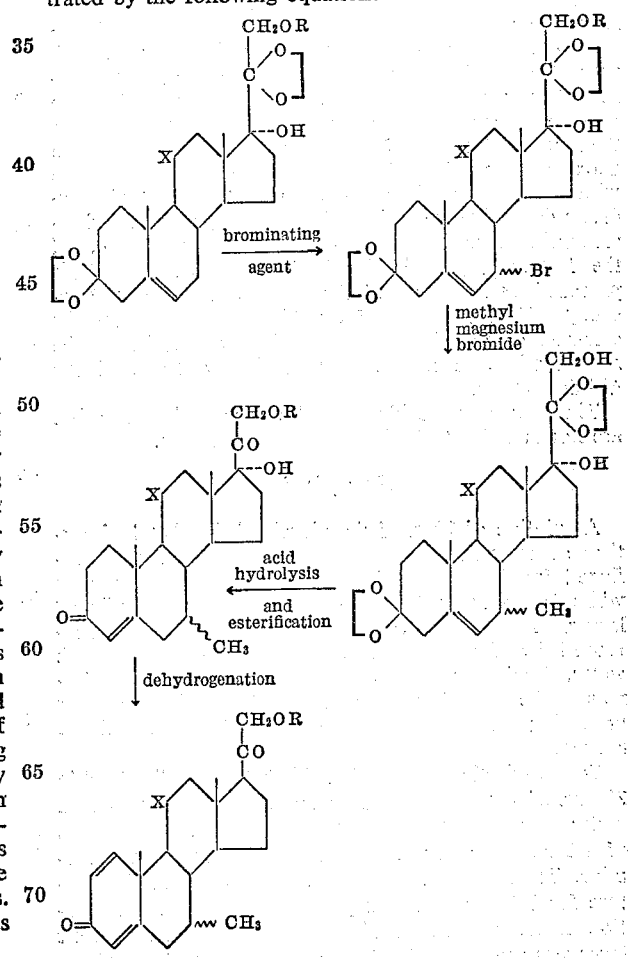

In the above equation X and R represent the same groups as heretofore set forth.

In practicing the process above outlined the C-21 ester of the diethyleneketal of cortisone or hydrocortisone in an organic solvent such as carbon tetrachloride is refluxed for a short period with a brominating agent preferably an N-bromo-imide or an N-bromo-amide such as for example N-bromoacetamide, N-bromotoluenesulfonamide, N-bromophthalimide or N-bromosuccinimide in the presence of strong light. The resulting 7-bromo derivative is then dissolved in an organic solvent such as dry benzene and slowly added to a solution of methyl magnesium bromide in an organic solvent such as ether. For this step of the reaction the reaction mixture is stirred for a period of time of the order of eight hours at room temperature. The resulting product after separation and purification is the 7-methyl-3,20-ethylenedioxy-$\Delta^4$-pregnen-17$\alpha$,21-diol-11-one derivative or the corresponding 11$\beta$-ol derivative.

Hydrolysis of these last compounds as with a mineral acid in methanol gave the corresponding 7-methyl-cortisone or 7-methyl-hydrocortisone which was a mixture of the 7$\alpha$ and 7$\beta$-derivatives consisting largely of the 7$\alpha$-isomer. By a conventional esterification procedure the corresponding 21-esters of hydrocarbon carboxylic acids of 2 to 12 carbon atoms were prepared. From the esters thus prepared the corresponding 1-dehydro derivatives were prepared by reaction with selenium dioxide preferably in the presence of a solvent such as t-butanol and acetic acid. These compounds could be readily saponified to give the free corresponding 7-methyl-1-dehydro derivatives.

By a different process there can be prepared the 7$\beta$-methyl derivatives of cortisone, hydrocortisone, 1-dehydrocortisone and 1-dehydro-hydrocortisone. This process involves starting from 21-esters of the dicycloethylene ketal of cortisone and similarly preparing the 7-bromo derivative by reaction with N-bromosuccinimide. The 7-bromo derivative thus produced was then reacted with neutral washed alumina (of the type used for chromatography containing hydroxyl and hydrogen ion) to prepare the corresponding 7-hydroxy derivative which was then oxidized to the 7-keto compound with chromium trioxide in pyridine. Reaction of the 7-keto derivative with methyl magnesium bromide gave the 7-methyl 7-hydroxy derivative and acid hydrolysis, dehydration and rearrangement the 3,20-diketo-7-methyl-$\Delta^{4,6}$-compound. If the 11$\beta$-hydroxy derivative is desired the hydrolysis is preceded by reduction of the 11-keto group to 11$\beta$-hydroxy. Hydrogenation of the $\Delta^{4,6}$-compounds gave the corresponding $\Delta^4$-derivatives and dehydrogenation of the $\Delta^4$-derivatives in the manner previously described the $\Delta^{1,4}$-derivatives.

The following specific examples serve to illustrate but are not intended to limit the present invention.

Example I

A solution of 10 g. of the dicycloethyleneketal of cortisone acetate in 150 cc. of carbon tetrachloride was refluxed for 8 minutes with 6 g. of N-bromosuccinimide while being exposed to the light of two "Photoflood" lamps. After cooling, the supernatant precipitate was removed by filtration and the filtrate was washed with water, dried over sodium sulfate and evaporated to dryness. The precipitate was triturated with hexane, thus producing the dicycloethyleneketal of 7-bromo-cortisone acetate.

Without further purification this ketal was dissolved in 200 cc. of dry benzene and the solution was slowly added under anhydrous conditions and under stirring to 40 cc. of a 3-normal ether solution of methyl magnesium bromide. The reaction mixture was stirred at room temperature for 8 hours and then poured into an aqueous solution of ammonium chloride and stirred. The benzene layer was separated, dried over anhydrous sodium sulfate and evaporated to dryness. The residue was dissolved in a mixture of hexane and ether (8:1) and chromatographed in a column of washed alumina. Elution with benzene-ether yielded the pure 7-methyl-3,20-ethylenedioxy-$\Delta^5$-pregnen-17$\alpha$,21-diol-11-one.

A mixture of 5 g. of this diketal, 700 cc. of methanol and 70 cc. of 8% sulfuric acid was refluxed for 40 minutes, cooled, neutralized with saturated sodium bicarbonate solution and filtered. The solvent was removed by distillation under reduced pressure and the residue was treated with water. The resulting suspension was extracted with ethyl acetate, the extract was washed with water, dried over anhydrous sodium sulfate and evaporated to dryness. Crystallization of the residue from acetone-hexane afforded the desired 7-methyl-cortisone.

2 g. of 7-methyl-cortisone dissolved in 40 cc. of pyridine was treated with 10 cc. of acetic anhydride, the mixture was kept at room temperature for 16 hours and then poured into ice water. The product was extracted with ether, the ether extract was washed with dilute hydrochloric acid, water, sodium bicarbonate solution and water, dried over anhydrous sodium sulfate and evaporated to dryness under vacuum. The residue crystallized from ether-acetone to give the 21-acetate of 7-methyl-cortisone.

Example II

Following the method described in the previous example, but starting from the dicycloethyleneketal of hydrocortisone acetate, there was obtained 7-methyl-hydrocortisone.

1 g. of this 7-methyl-hydrocortisone was dissolved in 20 cc. of pyridine and mixed with 4 g. of trimethylacetyl chloride. The mixture was kept at room temperature for 16 hours and then poured into ice water. The ester was isolated by an analogous method to the one described in the previous example. There was thus obtained the 21-trimethylacetate of 7-methyl-hydrocortisone.

Example III

By essentially the same methods as those described in the previous example, there can also be prepared other 21-esters of 7-methyl-cortisone or of 7-methyl-hydrocortisone, such as for example the propionates, benzoates and cyclopentylpropionates.

Example IV 3 g. of the 21-acetate of 7-methyl-cortisone, obtained by the method described in Example I, was dissolved in 150 cc. of t-butanol containing 1.5 cc. of acetic acid and then mixed with 0.9 g. of selenium dioxide. The mixture was refluxed under an atmosphere of nitrogen for 36 hours, at the end of which an additional 0.9 g. of selenium was added and the refluxing was continued to a total period of 72 hours. The reaction mixture was cooled and decanted from the selenium which had separated during the reaction. The selenium residue was washed with a little ethyl acetate and this solvent was combined with the butanol solution. It was filtered through celite and the solvent was removed under vacuum to dryness. The residue was dissolved in a mixture benzene-chloroform (8:2) and chromatographd in a column of neutral washed alumina. The column was eluted with mixtures of solvents in which the proportion of chloroform was progressively increased. The fractions obtained with the mixture benzene-chloroform 6:4 were crystallized from ether-hexane, thus producing the acetate of 7-methyl-$\Delta^{1,4}$-pregnadien-17$\alpha$,21-diol-3,11,20-trione (acetate of 7-methyl-1-dehydro-cortisone).

1 g. of this acetate was suspended in 100 cc. of methanol, cooled to 0° C., and stirring under an atmosphere of nitrogen, mixed with a solution of 100 mg. of potassium hydroxide in 2 cc. of water. The mixture was kept under nitrogen for 1 hour and then acidified with acetic acid. The methanol was removed by distillation under reduced pressure, the residue was treated with water and the precipitate was collected and crystallized from acetone-hexane, thus giving 7-methyl-1-dehydrocortisone.

Example V

Following the method described in the previous example, but starting from the 21-acetate of 7-methyl-hydrocortisone, there was obtained the 21-acetate of 7-methyl-1-dehydro-hydrocortisone which was then saponified to the free 7-methyl-1-dehydro-hydrocortisone.

Example VI 2 g. of N-bromoacetamide was added to a hot solution of 5 g. of the 21-acetate of 3,20-bis-ethylenedioxy-$\Delta^5$-pregnen-17α,21-diol-11-one in 600 cc. of carbon tetrachloride and the mixture was allowed to react for 10 minutes under illumination with a "G.E. Photoflood" lamp. It was then cooled in an ice bath, filtered through celite, the filter was washed with carbon tetrachloride and the filtrate and washings which contained the 21-acetate of 7 - bromo - 3,20-bis - ethylenedioxy - $\Delta^5$ - pregnen-17α,21-diol-11-one were obtained.

This solution was stirred for 3.5 hours at room temperature with 50 g. of neutral washed alumina, and filtered. The filtrate was washed with acetone and the combined filtrate and washings were evaporated to dryness under vacuum. The residue consisted of the crude 21-acetate of 3.20-bis-ethylenedioxy - $\Delta^5$ - pregnen - 7,17α,21-triol-11-one.

The crude 21-acetate of 3,20-bis-ethylenedioxy-$\Delta^5$-pregnen-7,17α,21-triol-11-one was dissolved in 50 cc. of pyridine, cooled to 0° C. and mixed with approximately 5 g. of chromium trioxide which was added in small portions and under stirring; the stirring was continued overnight at room temperature, the mixture was diluted with 200 cc. of ethyl acetate, filtered through celite and then passed through a short column of washed alumina. The solvent was evaporated to dryness under reduced pressure and the residue was purified by repeated crystallizations from acetone-hexane. There was thus obtained the 21-acetate of 3,20-bis-ethylenedioxy-$\Delta^5$-pregnen-17α,21-diol-7,11-dione, M.P. 257–258° C., ultraviolet absorption $$\lambda_{max.}^{EtOH} \; 238\text{–}240 \; m\mu, \; \log \epsilon \; 4.03$$

2 g. of the 21-acetate of 3,20-bis-ethylenedioxy-$\Delta^5$-pregnen-17α,21-diol-7,11-dione dissolved in 75 cc. of anhydrous tetrahydrofurane was treated dropwise with stirring with 20 cc. of a 3-normal solution of methyl magnesium bromide in ether. The stirring was continued at room temperature for 5 hours and the mixture was poured into ice water containing ammonium chloride. The reaction product was extracted with chloroform, washed with water to neutral, dried over anhydrous sodium sulfate, filtered and evaporated to dryness. The gummy residue was triturated with a little ether, the crystalline precipitate was collected and then recrystallized from acetone-ether, thus giving 7-methyl-3,20-bis-ethylenedioxy-$\Delta^5$-pregnen-7,17α,21-triol-11-one.

A solution of 1.5 g. of 7-methyl-3,20-bis-ethylenedioxy-$\Delta^5$-pregnen-7,17α,21-triol-11-one in 60 cc. of methanol was mixed with 6 cc. of 8% sulfuric acid in methanol and mixture was refluxed for 2 hours and then poured into water. The crystalline precipitate was collected and purified by several crystallizations from acetone-ether, thus giving 7-methyl-$\Delta^{4,6}$-pregnadiene-17α,21-diol-3,11,20-trione, M.P. 224–225° C., ultraviolet absorption $$\lambda_{max.}^{EtOH} \; 294 \; m\mu, \; \log \epsilon \; 4.45$$

A mixture of 3 g. of 7-methyl-$\Delta^{4,6}$-pregnadiene-17α,21-diol-3,11,20-trione, prepared as described above, 20 cc. of pyridine and 3 cc. of acetic anhydride was kept at room temperature for 4 hours and poured into water. The mixture was heated for half an hour on the steam bath, cooled and the precipitate was filtered, washed with water, dried and recrystallized from acetone-hexane, thus producing the 21-acetate of 7-methyl-$\Delta^{4,6}$-pregnadiene-17α,21-diol-3,11,20-trione.

Example VII 1 g. of 7-methyl-$\Delta^{4,6}$-pregnadiene-17α,21-diol-3,11,20-trione obtained as described in Example VI, in 350 cc. of thiophene free benzene containing 1 g. of previously reduced 2% palladium on calcium carbonate catalyst was hydrogenated at room temperature until the equivalent of 1.1 mols of hydrogen had been absorbed. The catalyst was removed by filtration and the solution was evaporated to dryness. The residue crystallized from methanol-ether to give 7β-methyl-cortisone. This was converted into its 21-acetate by the method of acetylation described in Example VI.

Example VIII 1.5 g. of the 21-acetate of 7β-methyl-cortisone of Example VII was converted into the 21-acetate of 7β-methyl-1-dehydro-cortisone by reaction with selenium dioxide as set forth in Example IV.

Example IX 2 g. of 7-methyl-3,20-bis-ethylenedioxy-$\Delta^5$-pregnen-7,17α,21-triol-11-one, obtained as described in Example VI, was dissolved in 300 cc. of tetrahydrofurane and mixed with 1.5 g. of lithium aluminum hydride dissolved in 150 cc. of tetrahydrofurane, which was added slowly under stirring. The mixture was refluxed for half an hour, the excess of hydride was decomposed by adding ethyl acetate and aqueous saturated sodium sulfate solution was added followed by the addition of solid sodium sulfate. The solids were removed by filtration and washed with ethyl acetate and the combined filtrate and washings was evaporated to dryness. Crystallization of the residue from methanol yielded 7 - methyl - 3,20 - bis-ethylenedioxy-$\Delta^5$-pregnen-7,11β,17α,21-tetrol.

1.5 g. of the above tetrol was treated with sulfuric acid to give 7 - methyl - $\Delta^{4,6}$ - pregnadien-11β,17α,21-triol-3,20-dione.

Example X

Following the method described in Example VII, 7-methyl-$\Delta^{4,6}$-pregnadiene-11β,17α,21-triol-3,20-dione was converted into the 21-acetate of 7β-methyl-hydrocortisone.

Example XI

The 21-acetate of 7β-methyl-hydrocortisone was converted into the 21-acetate of 7β-methyl-1-dehydro-hydrocortisone by reaction with selenium dioxide in accordance with the method of Example IV. Saponification of this ester by the method of Example IV gave the free 7β-methyl-1-dehydro-hydrocortisone.

Example XII

By the same methods previously set forth utilizing acid anhydrides or chlorides there was prepared the 21-propionates, benzoates and cyclopentylpropionates of 7β-methyl-1-dehydro-cortisone and 7β-methyl-1-dehydro-hydrocortisone.

We claim:
1. A process for the production of 7-methyl-3-keto-$\Delta^4$-pregnene compounds comprising reacting a corresponding 3-ethylenedioxy-$\Delta^5$-pregnene compound with a brominating agent to form the corresponding 7-bromo derivative, reacting the 7-bromo derivative with methyl magnesium bromide to form the corresponding 7-methyl-3-ethylenedioxy-$\Delta^5$-pregnene compound and hydrolysing this last mentioned compound.
2. The process of claim 1 wherein the brominating agent is N-bromosuccinimide in the presence of strong light.

3. A compound of the following formula:

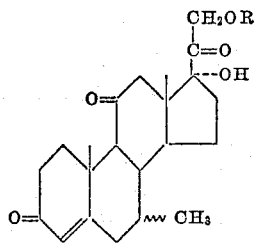

wherein R is selected from the group consisting of hydrogen and a hydrocarbon carboxylic acid acyl group of 2 to 12 carbon atoms.
4. 7-methyl-cortisone.
5. The 21-hydrocarbon carboxylic acid esters of 2 to 12 carbon atoms of 7-methyl cortisone.
6. 7α-methyl-cortisone.
7. The 21-hydrocarbon carboxylic acid esters of 2 to 12 carbon atoms of 7α-methyl cortisone.
8. A compound of the following formula:

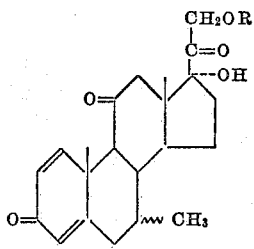

wherein R is selected from the group consisting of hydrogen and a hydrocarbon carboxylic acid acyl group of 2 to 12 carbon atoms.
9. 7-methyl-1-dehydro-cortisone.
10. The 21-hydrocarbon carboxylic acid esters of 2 to 12 carbon atoms of 7-methyl-1-dehydro-cortisone.
11. 7α-methyl-1-dehydro-cortisone.
12. The 21-hydrocarbon carboxylic acid esters of 2 to 12 carbon atoms of 7α-methyl-1-dehydro-cortisone.
13. 7 - methyl - 17α,21-dihydroxy-4-pregnene-3,11,20-trione 21-acetate.

References Cited in the file of this patent
UNITED STATES PATENTS

| | | |
|---|---|---|
| 2,752,369 | Holysz | June 26, 1956 |
| 2,837,464 | Nobile | June 3, 1958 |

OTHER REFERENCES

Pincus et al.: The Hormones, volume III, 1955, pages 549–550 and 552–553.
Fieser: Organic Chemistry, 1950, pages 151 and 152 and pages 991 and 998.
Nobile et al.: J.A.C.S. 1955, 77, 4184.